Aug. 10, 1965       J. R. MONROE       3,199,200
MICROMETER AMPLIFIER
Filed May 28, 1963
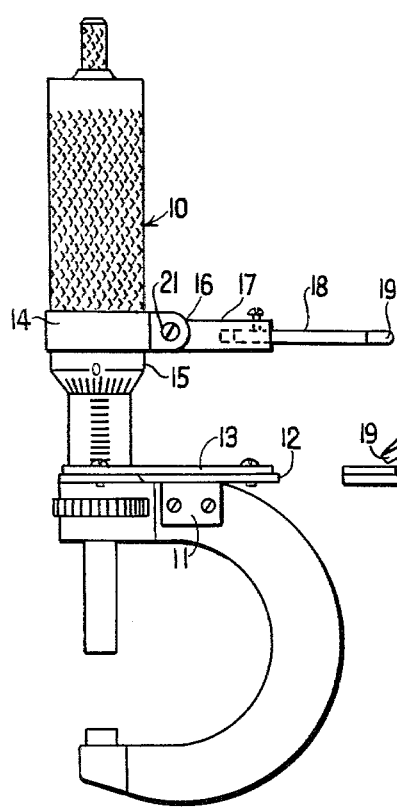
Fig. 1
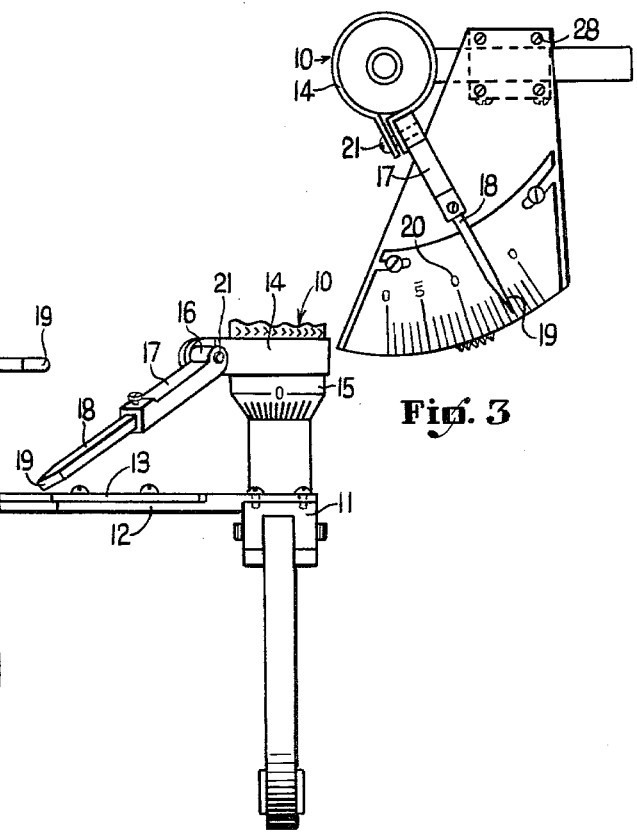
Fig. 2
Fig. 3
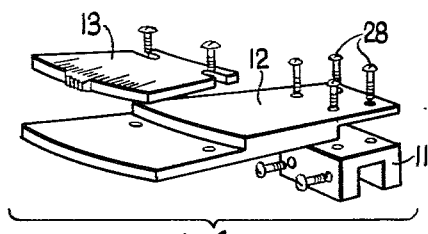
Fig. 4
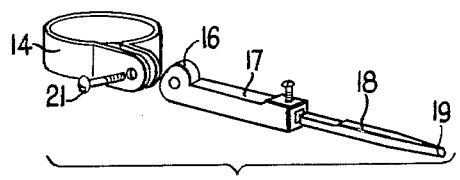
Fig. 5
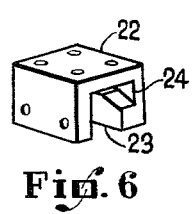
Fig. 6
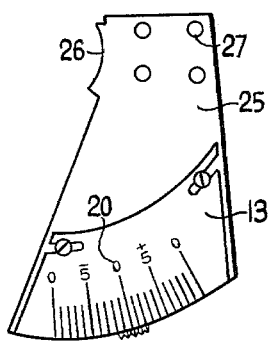
Fig. 7
INVENTOR
James R. Monroe.

United States Patent Office 3,199,200
Patented Aug. 10, 1965

3,199,200
MICROMETER AMPLIFIER
James R. Monroe, 3216 W. Page St., Philadelphia, Pa.
Filed May 28, 1963, Ser. No. 283,820
2 Claims. (Cl. 33—166)

This invention relates to small tools used for accurately measuring the parts of mechanical mechanisms and the like.

Small measuring tools, particularly micrometers, require excellent eyesight for the accurate reading of their scales when measuring the thickness, length, or diameter of a given part of a device or machine. Unfortunately, many excellent mechanics, inspectors, and others, having the need to use a micrometer, do not have perfect eyesight. This is very true of older men who have spent nearly a lifetime working with precision measuring instruments.

It is, therefore, the first object of this invention to provide an attachement for micrometers, that I personally call a micrometer amplifier, that will permit the accurate reading of the tool even by one with failing eyesight.

Another object of this invention is to provide a micrometer amplifier that will permit speedier reading of a micrometer, the result of which is that more work can be accomplished with this tool in a given period of time than is otherwise possible.

Another object of this invention is to provide a micrometer amplifier that can readily be assembled by anyone on any micrometer caliper of the hand type.

Another object of this invention is to provide a micrometer amplifier that will automatically reduce errors made in inspection of a given part because of improper reading due to poor eyesight, lack of sufficient light, or haste in taking the reading. This reduction of errors will naturally reduce the manufacturing cost of the product.

Another object of this invention is to provide a micrometer amplifier that will be of considerable value to a classroom instructor of machine shop or inspection practices.

Still another object of this invention is to provide a micrometer amplifier that will in some cases make it possible for the employment of less experienced personnel who must make frequent use of a micrometer.

The foregoing and other objects of the invention, which will be set forth hereinafter or will be apparent to one skilled in the art upon reading these specifications, are accomplished by that construction and arrangement of parts of which I shall now describe an exemplary embodiment. Reference is made to the accompanying drawing wherein:

FIGURE 1 is a side view of a typical micrometer caliper with this invention secured to the same.

FIGURE 2 is a side view of the lower portion of a typical micrometer caliper with this invention secured to the same and in position ready for use.

FIGURE 3 is a top view of a typical micrometer caliper with this invention secured to the same and in use.

FIGURE 4 is a pictorial exploded view of the graduated dial, dial holder, and saddle portion of this invention ready for assembly on the frame of a micrometer.

FIGURE 5 is an exploded pictorial view of the pointer and thimble clamp portion of this invention.

FIGURE 6 is a pictorial view of that portion of this invention known as the saddle.

FIGURE 7 is a top view of a slightly modified form of the dial holder and graduated dial secured to the same.

Similar reference characters refer to similar parts throughout the several views of the drawing.

Having reference now to the drawing in detail, there is generally indicated by the character 10 a typical micrometer caliper to which is firmly secured this invention which embodies six major parts, namely, the saddle 11, which is a block that has the shape of an inverted letter U when viewed from either end, and on the top of which is secured by screws the dial holder 12 which is a flat plate having a recess in the upper and outer end and a second recess in the lower and inner end as illustrated in the exploded pictorial view in FIGURE 4 of the drawing. The third of the six major parts of this invention is the graduated dial 13 which is mounted in the first mentioned recess of the aforesaid dial holder 12, of which the upper surface is flush with the upper surface of the aforesaid dial 13, while the fourth mentioned part of this invention is the thimble clamp 14, which is fitted around the thimble 15 of the micrometer caliper 10 and provides swingable support for one end 16 of the pointer holder 17 and the pointer 18, the last part being the sixth major part of this invention, which is assembled with a plurality of machine screws, which are shown in all of the figures of the appended drawing with the exception of FIGURE 6.

It is obvious to anyone who has a working knowledge of micrometer calipers that, when the above described six major parts of this invention are assembled in the manner shown in the appended drawing, that when the pointer 18 is set with its lower end 19 just above the centrally located zero mark 20 on the dial 13, and that when the micrometer caliper 10 is adjusted to read zero, the pointer will then indicate the reading of the micrometer caliper on the dial 13 in an amplified way when the micrometer caliper is used in the usual way in the course of measuring the thickness, length, or diameter of a given part of a device or machine. The screw 21 is, of course, the one that must be loosened or tightened in order to bend the lower end 19 of the pointer 18 of the already mentioned "zero" of the graduated dial 13. The screw 21 secures the thimble clamp 14, to which the pointer 18 is attached to the thimble 15 of the micrometer caliper 10.

FIGURE 6 of the drawing illustrates a slightly modified saddle 22 that has one side of the recess 23 set back as indicated by the reference numeral 24 for use on the web type micrometer frames. This latter type is not illustrated in any of the views of the appended drawing.

FIGURE 7 illustrates a slightly modified dial holder 25 that is provided with a concave edge 26 portion that fits snugly up against the sleeve of the micrometer for mounting on micrometers that have sleeves that are not centrally located in relation to the frame. In this modified form, the four openings 27 for reception of the holding screws 28 are slightly larger in diameter than the screws 28 in order to permit the shifting of the dial holder 25 on the saddle of this invention.

It is to be noted that the graduated dial 13 is also secured by screws to the dial holder 12. This is, among other things, to permit the dial to be replaced by any specially graduated dial that may be needed for a given job. It also permits replacement of the graduated dial in the event that the original one becomes scarred or otherwise damaged.

The very novel way in which this above described invention is constructed permits its use as a pressure indicator due to the travel of the pointer 18, as will be understood by anyone having personal experience with small tools.

Modifications may be made in the invention without departing from the spirit of it.

Having thus described my invention, what I claim as new and desire to secure by Letters Patent is:

1. A micrometer amplifier of the character described comprising; a flat plate, a graduated dial on one side of the flat plate, a saddle which is substantially the shape of an inverted capital letter U when viewed from either end to fit over the frame of a micrometer caliper, means to clamp the saddle to said frame, the flat plate extending along the central portion of said saddle, on the outer side thereof and secured to said central portion, a thimble clamp to engirth the thimble of a micrometer caliper, a pointer holder, a pointer in telescopic engagement with the pointer holder and a swinging connection between the pointer holder and the thimble clamp to permit adjustment of the pointer towards or away from the graduated dial.

2. A micrometer amplifier of the character described comprising; a flat plate, a graduated dial on one side of the flat plate, means to secure the flat plate to the upper end of the frame of a micrometer caliper with the flat plate substantially at right angles to the axis of the thimble of a micrometer caliper, a thimble clamp to engirth the thimble of a micrometer caliper, a pointer holder, a pointer in telescopic engagement with the pointer holder and a swinging connection between the pointer holder and the thimble clamp to permit adjustment of the pointer toward or away from the graduated dial.

References Cited by the Examiner

UNITED STATES PATENTS

| | | | |
|---|---|---|---|
| 1,269,756 | 6/18 | Slocomb | 33—166 |
| 1,589,462 | 6/26 | Ghetto | 33—167 |
| 1,602,292 | 10/26 | Walden | 33—167 |
| 1,629,480 | 5/27 | Darlington | 33—166 X |
| 2,674,806 | 4/54 | Sagona | 33—166 X |
| 2,835,040 | 5/58 | d'Elia | 33—167 |

FOREIGN PATENTS 114,449   10/00   Germany.

ISAAC LISMANN, *Primary Examiner*.